US012705244B1

(12) United States Patent
Sui et al.

(10) Patent No.: US 12,705,244 B1
(45) Date of Patent: Aug. 11, 2026

(54) OPTIMIZED VECTOR DATA STORAGE

(71) Applicant: International Business Machines Corporation, Armonk, NY (US)

(72) Inventors: Guang Han Sui, Beijing (CN); Jun Su, Beijing (CN); Peng Hui Jiang, Beijing (CN); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/049,500

(22) Filed: Feb. 10, 2025

(51) Int. Cl.
*G06F 16/00* (2019.01)
*G06F 16/215* (2019.01)
*G06F 16/2455* (2019.01)

(52) U.S. Cl.
CPC ...... *G06F 16/24564* (2019.01); *G06F 16/215* (2019.01)

(58) Field of Classification Search
None
See application file for complete search history.

(56) References Cited

U.S. PATENT DOCUMENTS 10,592,532 B2 3/2020 Ryan et al.
11,144,518 B2 10/2021 Sun et al.
11,853,279 B2 12/2023 Walker et al.
2019/0129888 A1 5/2019 Bowman et al.
2020/0285737 A1* 9/2020 Kraus .................. G06F 21/552

FOREIGN PATENT DOCUMENTS

CN 107480199 B 6/2020
CN 117608476 A 2/2024
CN 117851443 A 4/2024
WO WO-2025119443 A1 * 6/2025 ............ G06F 40/30

OTHER PUBLICATIONS

Fan (CN-119166064-A), "Storage Resource Allocation Method, Device, Equipment And Medium", Dec. 20, 2024, 19 Pages. (Year: 2024).*

* cited by examiner

*Primary Examiner* — Bai D Vu

(57) ABSTRACT

An embodiment includes responsive to receiving a request by a system, determining if the request is a write operation of a vector embedding to a block of a data store of the system. The embodiment includes performing the write operation of the vector embedding to the block of the data store wherein the block is determined according to a rule. The embodiment also includes extracting an identifier of the block and modifying a metadata value of the data store with the identifier and the rule.

20 Claims, 7 Drawing Sheets

220

240
270
METADATA:
IN DATA BLOCK 1 WITH RULE 1
IN DATA BLOCK 2 WITH RULE 2
IN DATA BLOCK 3 WITH RULE 3
230
TOM HAS A RED PEN
260
RULE 1 : WITH RED COLOR
RULE 2 : SCHOOL SUPPLIES
RULE 3 : XXXXXX
THAT APPLE IS RED
JERRY BUYS A STORY BOOK
.......
DATA BLOCK 1
DATA BLOCK 2
DATA BLOCK 3
250

Fig. 4
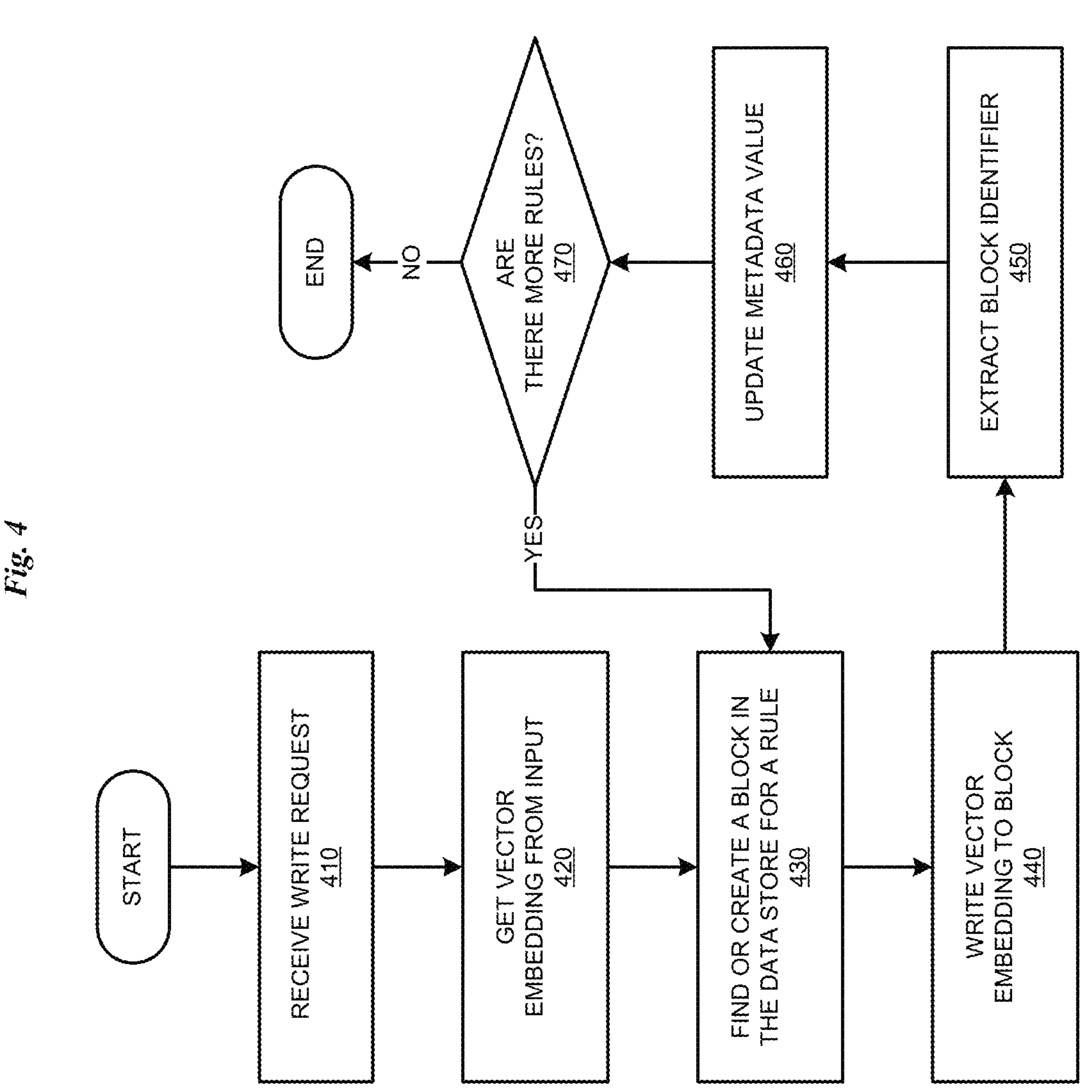

*Fig. 5*
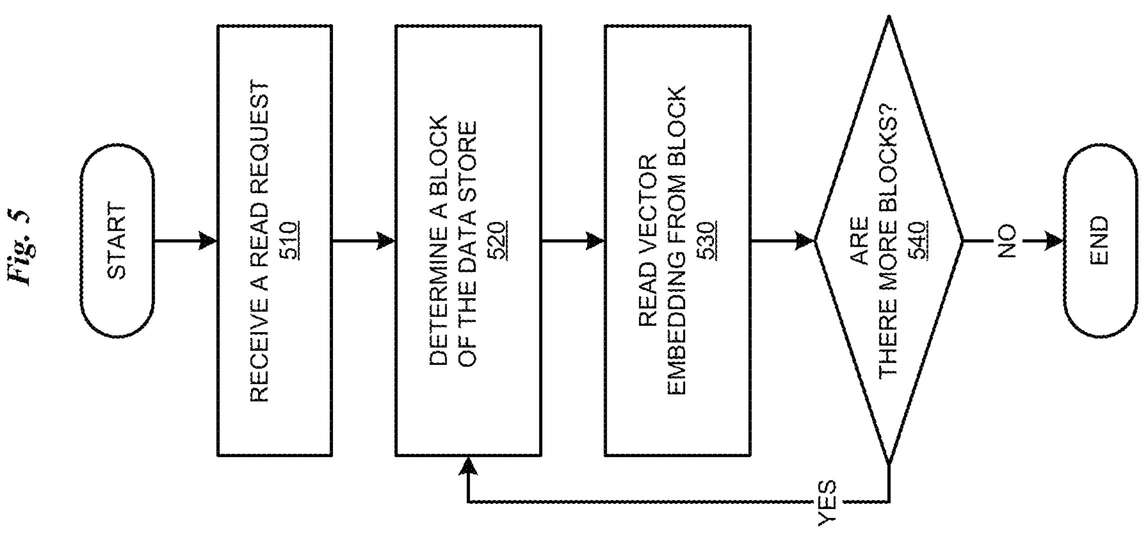

OPTIMIZED VECTOR DATA STORAGE

BACKGROUND

The present invention relates generally to data storage. More particularly, the present invention relates to a method, system, and computer program for An Optimized Vector Data Storage.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

Traditional databases are optimized for structured data that fits well into tables, like financial records or customer information. AI databases, on the other hand, are built to handle a variety of data types, including unstructured data like images, audio, and text. They also offer flexible schemas or even schema-less data management to accommodate the fluid nature of AI data. The scale of data used in AI can be massive and grow unpredictably. AI databases are designed to be highly scalable, both in terms of storage and computational power, to meet the needs of large-scale machine learning tasks. They provide the ability to scale out (adding more nodes) rather than just scale up (adding more power to a single node), which is a common limitation in traditional databases.

SUMMARY

The illustrative embodiments provide for An Optimized Vector Data Storage. An embodiment includes responsive to receiving a request by a system, determining if the request is a write operation of a vector embedding to a block of a data store of the system. The embodiment includes performing the write operation of the vector embedding to the block of the data store wherein the block is determined according to a rule. The embodiment also includes extracting an identifier of the block and modifying a metadata value of the data store with the identifier and the rule.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 4 depicts a flow chart that illustrates an example of a write operation in an environment in accordance with an illustrative embodiment;

FIG. 5 depicts a flow chart that illustrates an example of a read operation in accordance with an illustrative embodiment;

DETAILED DESCRIPTION

Figure 1:
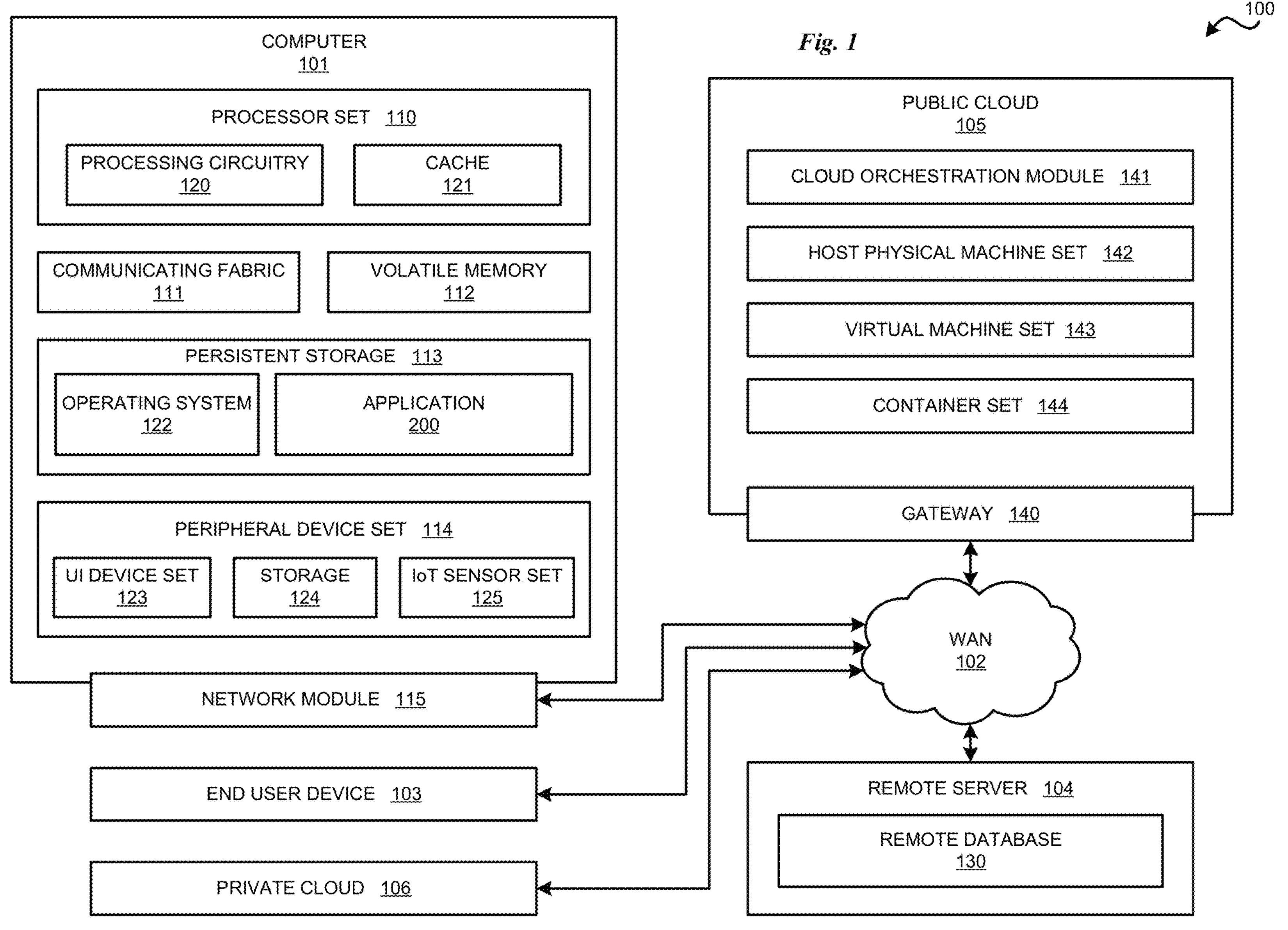
FIG. 1 depicts a block diagram of a computing environment in accordance with an illustrative embodiment.

In machine learning, vectors are data structures that represent data in an organized way. They are used to organize data, perform operations such as clustering, classification, and regression, searching. Vectors allow algorithms to calculate similarities and distances to make predictions and learn patterns.

Vector databases are widely used at AI area, query requests are heavy, and the write requests are light. Data for one vector will be saved to three or more data blocks on disks for recoverability, the data blocks are selected randomly or by single rule. With random rule, there is no optimization for query request; with single rule, there is only optimization for one specific query request, while there are different kinds of query requests for one vector, some kinds of query requests cannot be accelerated.

The following description provides examples of embodiments of the present disclosure, and variations and substitutions may be made in other embodiments. Several examples will now be provided to further clarify various aspects of the present disclosure.

Example 1: A computer-implemented method that comprises responsive to receiving a request by a system, determining if the request is a write operation of a vector embedding to a block of a data store of the system. The method further comprises performing the write operation of the vector embedding to the block of the data store wherein the block is determined according to a rule. The method further comprises extracting an identifier of the block and modifying a metadata value of the data store with the identifier and the rule. The above limitations advantageously enable building an optimized vector data storage. These limitations improve computer functionality since the write operation to the data store reduces the load on processors, memory and network.

The term "data store" as disclosed herein may comprise a digital repository that stores and safeguards the information in computer systems. A data store can be network-connected storage, distributed cloud storage, a physical hard drive, or virtual storage. A data store may be a database, and store both structured data and unstructured data.

The term "write operation" as disclosed herein may comprise recording and/or storing data into a data store. The term "read operation" may refer to the operation of accessing and retrieving data from a particular physical and/or logical location in the data store.

The term "block" as disclosed herein may comprise at the finest level of granularity of a data store. One data block corresponds to a specific number of bytes of physical and/or logical space on disk and/or computer hardware. The term "identifier of the block" as disclosed herein may comprise a physical and/or logical address in a format including but not limited to binary and/or hexadecimal format that identifies the block on the physical and/or logical space on disk and/or computer hardware. The term "extracting" as disclosed herein may comprise using computer resources including but not limited to a processor, memory and networks to read, assemble or transfer an identifier of a block of the data store.

The term "rule" as disclosed herein may comprise a condition that defines how a data store should respond to certain events. However, use of this example is not intended to be limiting but is instead used for descriptive purposes only.

The term "metadata" as disclosed herein may comprise a one-to-one, a one-to-many, and a many-to-many information that describes and explains data in a data store. The term "modifying" as used in embodiments herein may mean to change a value of the metadata to a different value.

The term "embedding" as disclosed herein may comprise representations of values or objects like text, images, and audio that are designed to be consumed by machine learning models, in whole or a subset, where a vector of the embedding includes but is not limited to a data structure in a machine learning system that represent data in an organized way.

Example 2: The limitations of Example 1, where if the request is a read operation, performing the read operation of the vector embedding from the block of the data store where the block is determined according to a comparison between the request and the rule in the metadata.

The above limitations advantageously enable a system to perform a read operation of the vector embedding from the block of the data store through a comparison between the request and the rule in the metadata. These limitations further improve computer functionality since the central processing unit may require less usage to perform the read operation by accessing the metadata. Additionally, the limitations realize the benefits described with respect to Example 1.

The term "comparison" as disclosed herein may mean a method including but not limited to text matching and/or similarity matching.

Example 3: The limitations of Example 2, where performing the write operation comprises creating a new block based on a new rule.

The above limitations advantageously enable a system to perform a write operation in a data store by creating a new block including but not limited to when a block does not exist and/or a block is full. These limitations improve on the functionality of a system by improving the efficient use of computer resources of a data store. Additionally, the limitations realize the benefits described with respect to Examples 1-2.

Example 4: The limitations of Example 1, where the rule is based on a vector distance between two or more vector embeddings.

The above limitations advantageously enable a rule to be determined using a vector distance between two or more vector embeddings. These limitations improve the use of computer resources since a vector embedding may be stored/read in a data store using a vector distance. Additionally, the limitations realize the benefits described with respect to Examples 1-3.

Example 5: The limitations of Example 1, the block is determined based on a similarity learning between the rule and the vector embedding.

The above limitations advantageously enable the system to perform read/write operations on the data store using similarity learning. These limitations improve computer functionality since the read/write operations use similarity learning that reduces the use of central processing unit and memory resources. Additionally, the limitations realize the benefits described with respect to Examples 1-4.

The term "similarity learning" as disclosed herein may comprise known similarity learning methods such as cosine similarity, and or Siamese networks; however, use of this example is not intended to be limiting but is instead used for descriptive purposes only.

Example 6: The limitations of Example 1, where updating the rule causes the modification of the metadata value.

The above limitations advantageously enable the system to enable updating of rules of the data store. These limitations improve computer functionality since the updating involves modification of the metadata value reducing resource use of central processing unit and memory. Additionally, the limitations realize the benefits described with respect to Examples 1-5.

Example 7: The limitations of Example 1, where if the request is a delete operation of the vector embedding, performing the delete operation of the vector embedding from the block of the data store wherein the block is determined according to a comparison between the request and the rule and the vector embedding is deleted from the metadata value.

The above limitations advantageously enable a delete of a vector embedding from the data store. These limitations improve computer functionality since the deleting involves determination of a block of a data store where the vector embedding is stored reducing resource use of central processing unit and memory. Additionally, the limitations realize the benefits described with respect to Examples 1-6.

Example 8: A computer program product comprising one or more computer readable storage media, and program instructions collectively stored on the one or more computer readable storage media, the program instructions executable by a processor to cause the processor to perform the method according to any of Examples 1-7. The computer program product of Example 8 realizes the benefits described with respect to Examples 1-7. The computer program product of Example 8 can advantageously be implemented into a variety of computer program products.

Example 9: A computer system comprising a processor and one or more computer readable storage media, and program instructions collectively stored on the one or more computer readable storage media, the program instructions executable by the processor to cause the processor to perform the method according to any of Examples 1-7. The computer system of Example 7 realizes the benefits described with respect to Examples 1-7. The computer system of Example 9 can advantageously be implemented into a variety of computer devices.

Example 10: A computer-implemented method that comprises responsive to receiving a request by a system, determining if the request is a write operation of a vector embedding to a block of a data store of the system. The method further comprises performing the write operation of the vector embedding to the block of the data store wherein the block is determined according to a rule. The method further comprises extracting an identifier of the block and modifying a metadata value of the data store with the identifier and the rule. The method further comprises if the request is a read operation, performing the read operation of the vector embedding from the block of the data store wherein the block is determined according to a comparison between the request and the rule in the metadata. The method further comprises if the request is a delete operation of the vector embedding, performing the delete operation of the vector embedding from the block of the data store wherein the block is determined according to a comparison between the request and the rule and the vector embedding is deleted from the metadata value. The above limitations realize the technical benefits described with respect to Examples 1-7.

Example 11: A computer program product comprising one or more computer readable storage media, and program instructions collectively stored on the one or more computer readable storage media, the program instructions executable by a processor to cause the processor to perform the method according to Example 10. The computer program product of Example 11 realizes the technical benefits described with respect to Examples 1-7. The computer program product of Example 11 can advantageously be implemented into a variety of computer program products.

Example 12: A system comprising one or more processors and one or more computer-readable storage media collectively storing program instructions which, when executed by the one or more processors, are configured to cause the one or more processors to perform the method according to Example 10. The system of Example 12 realizes the benefits of Examples 1-7. The system of Example 12 can advantageously be implemented into a variety of computing devices.

Aspects of the present disclosure can be implemented in a variety of technical use cases. The following use cases are merely exemplary and are not intended to limit the scope of the disclosure.

In a use case, a system stores vector embeddings of a neural network in a database. The system performs a write operation of the vector embedding to the block of the data store where the rule is based on a vector distance between two or more vector embeddings. A block may also be determined according to a rule comprising a similarity learning between the rule and the vector embedding. The system extracts an identifier of the block and modifies a metadata value of the data store with the identifier and the rule. Updating the rule by the system may cause the modification of the metadata value in the data store. The system performs a read operation of the vector embedding from the block of the data store where the block is determined according to a comparison between the request and the rule in the metadata. The system also performs a delete operation of the vector embedding from the block of the data store wherein the block is determined according to a comparison between the request and the rule and the vector embedding is deleted from the metadata value.

The present disclosure provides for a method, a machine-readable medium, and a system for An Optimized Vector Data Storage.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides An Optimized Vector Data Storage. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
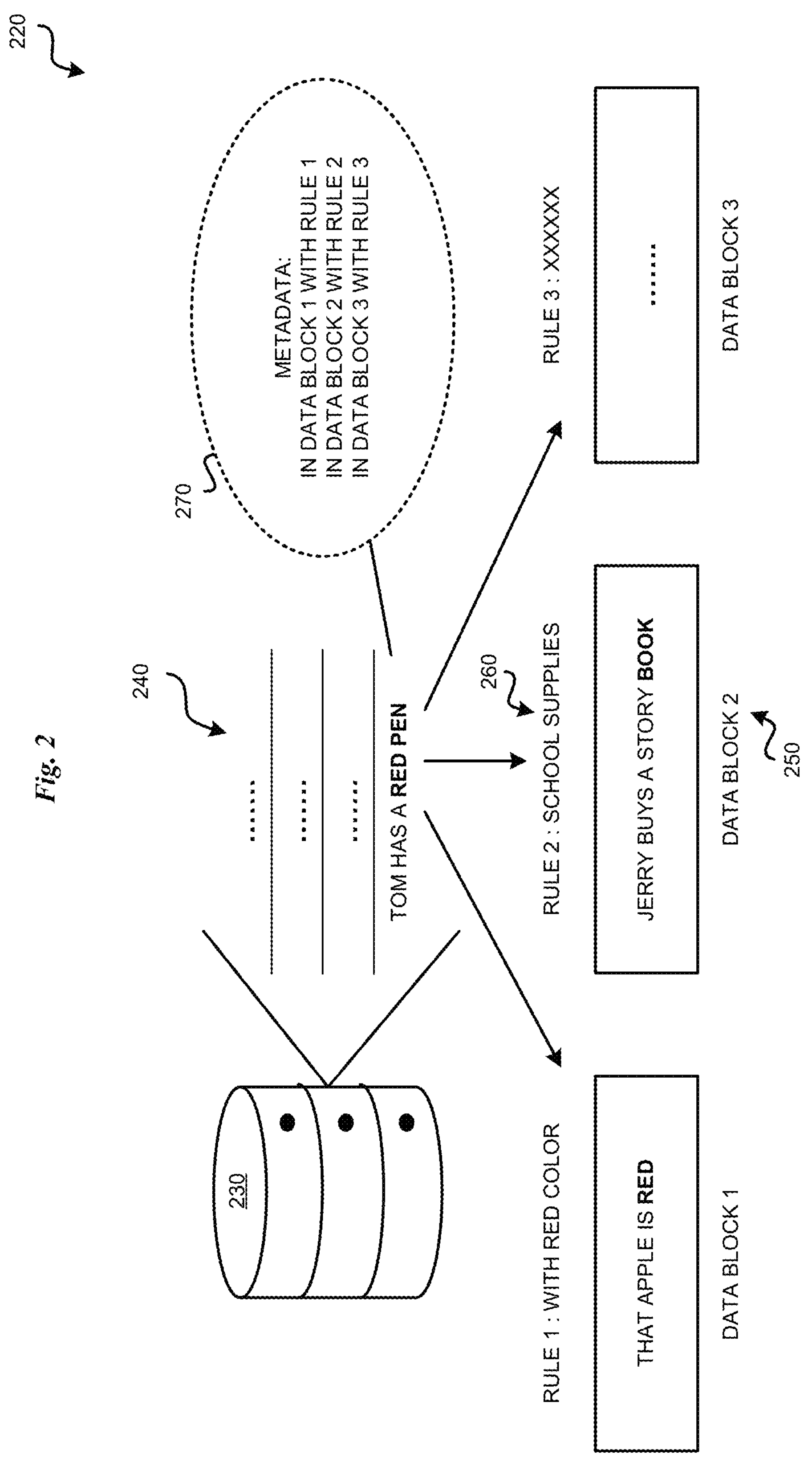
FIG. 2 depicts a block diagram that illustrates an example of an optimized vector data storage in an environment in accordance with an illustrative embodiment.

FIG. 2 depicts a block diagram that illustrates an example of an optimized vector data storage in an environment in accordance with an illustrative embodiment. In a particular embodiment, the components of the diagram 220 show aspects of the Application 200 of FIG. 1.

In the illustrated embodiment, a system comprises a data store 230 and a vector embedding 240 for which the system performs read/write/delete/update operations in the data store. For example, a vector embedding representing the text string "Tom has a red pen". In embodiments, the vector embedding may be a data structure in a machine learning system that represent data in an organized way. They are used to organize data into containers for machine learning applications, perform operations like clustering, classification, and regression. Allow algorithms to calculate similarities and distances to make predictions and learn patterns, identify similar objects, which can be used for search, recommendations, and text generation. As an example, vector embeddings may be n-dimensional vectors that can be used to calculate similarity. The first step in building a machine learning model is vectorizing the data, which involves converting images and text into numbers and storing them in vectors and matrices.

In an embodiment, a data store 230 is a digital repository that stores and safeguards the information in computer systems. A data store can be network-connected storage, distributed cloud storage, a physical hard drive, or virtual storage. It can store both structured data like information tables and unstructured data like emails, images, and videos. In embodiments, at the finest level of granularity, a vector embedding is stored in one or more data blocks 250 where the block is determined by a rule 260.

In another embodiment, a data store 230 is a relational database that may be a collection of information that organizes data in predefined relationships where data is stored in one or more tables (or "relations") of columns and rows, making it easy to see and understand how different data structures relate to each other. Relationships are a logical connection between different tables, established on the basis of interaction among these tables. Attributes (columns) specify a data type, and each record (or row) contains the value of that specific data type. All tables in a relational database have an attribute known as the primary key, which is a unique identifier of a row, and each row can be used to create a relationship between different tables using a foreign key-a reference to a primary key of another existing table. But relational databases also excel at showing very complex relationships between data, allowing you to reference data in more tables as long as the data conforms to the predefined relational schema of the database.

In embodiments, a data store 230 is a vector database which is a collection of vector embeddings stored as mathematical representations. Vector databases make it easier for machine learning models to remember previous inputs, allowing machine learning to be used to power search, recommendations, and text generation use-cases. Data can be identified based on similarity metrics instead of exact matches, making it possible for a computer model to understand data contextually.

In embodiments, a rule 260 may be derived from historical vector embeddings, other data or use cases. Specifically, in one embodiment, a rule may be derived using clustering of historical vector embeddings. Clustering is an unsupervised machine learning algorithm that organizes and classifies different objects, data points, or observations into groups or clusters based on similarities or patterns. Centroid-based clustering is a type of clustering method that partitions or splits a data set into similar groups based on the distance between their centroids. Each cluster's centroid, or center, is either the mean or median of all the points in the cluster depending on the data.

One of the known clustering techniques is the k-means clustering algorithm. K-means assumes that the center of each cluster defines the cluster using a distance measure, mostly commonly Euclidean distance, to the centroid. To initialize the clustering, number of expected clusters is provided, which represents the 'K' in K-means, and the algorithm attempts to find reasonable clusters across the data to match that number. The optimal k clusters in a given dataset are identified by iteratively minimizing the total distance between each point and its assigned cluster centroid.

Hierarchical clustering, sometimes called connectivity-based clustering, groups data points together based on the proximity and connectivity of their attributes. This method determines clusters based on how close data points are to one another across all of the dimensions. The idea is that objects that are nearer are more closely related than those that are far from each other. Unlike k-means, there is no need to pre-specify the number of clusters. Instead, the clustering algorithm creates a graph network of the clusters at each hierarchical level.

Density-based clustering works by detecting areas where points are concentrated and where they are separated by areas that are empty or sparse. Unlike centroid based approaches, like K-means, or distribution-based approaches, like Expectation Maximization, density-based clustering can detect clusters of an arbitrary shape. This can be extremely helpful when clusters aren't defined around a specific location or distribution. Unlike other clustering algorithms, such as K-means and hierarchical clustering, a density-based algorithm can discover clusters of any shape, size, or density of the data.

In some embodiments, a rule 260 may be derived using a classification model which is a type of machine learning model that sorts data points into predefined groups called classes. Classifiers learn class characteristics from input data, then learn to assign possible classes to new unseen data according to those learned characteristics.

In embodiments, a metadata 270 of the system may comprise of a format such as a name-value pair where the name may be the rule and the value is the block identifier or the name may be the block identifier and the value is the rule. In other examples, the metadata comprises of a concatenated string value of rule and block address. In some embodiments, the metadata is stored in the data store and/or in some other component of the system. With respect to the above example, the rule is "with red color" and the value is the identifier of the block where the vector embedding is stored in the data store. It should be noted that the use of text strings for vector embeddings, rules and block identifiers is for illustrative purposes only. For example, vector embeddings, rules and block identifiers may also be represented as binary, hexadecimal, or any other data format suitable for fast data retrieval in a computing environment.

Figure 3:
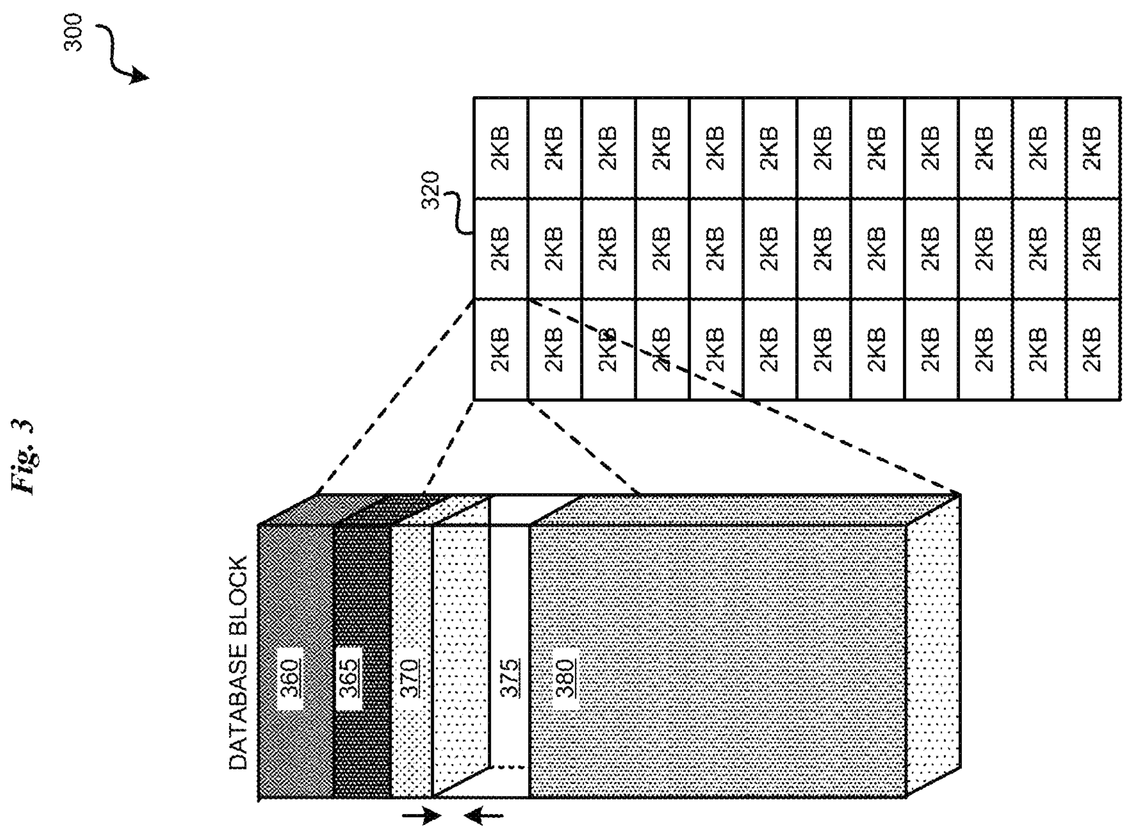
FIG. 3 depicts a block diagram that illustrates an example of a block in a data store in an environment in accordance with an illustrative embodiment.

FIG. 3 depicts a block diagram that illustrates an example of a block in a data store in an environment in accordance with an illustrative embodiment. In a particular embodiment, the components of the diagram 300 show aspects of components of FIG. 2 and the components of Application 200 of FIG. 1.

In the illustrated embodiment, a data store may comprise of several blocks 320 of a particular size. A format of a block of a data store comprises a header 360 that contains general block information, such as the block address and the type of segment (for example, data or index). The block identifier may be a block address which comprises a physical block address (cylinder number, track number, and block number), and/or a logical block address (LBA) of fixed length bits. A table may map a logical address to a physical address. One data block corresponds to a specific number of bytes of physical database space on disk. The block identifier may be extracted by a binary operation on the header and/or accessing the mapping table.

The block comprises a table directory 365, a portion of the data block that contains information about the tables having rows in this block, a row directory containing information about the actual rows in the block (including addresses for each row piece in the row data area). Once the space has been allocated in the row directory 370 of a data block's overhead, this space is not reclaimed when the row is deleted. Therefore, a block that is currently empty but had up to 50 rows at one time continues to have 100 bytes allocated in the header for the row directory. The data block header, table directory, and row directory are referred to collectively as overhead. Some block overhead is fixed in size; the total block overhead size is variable. On average, the fixed and variable portions of data block overhead total 84 to 107 bytes. Row data 380 portion of the data block contains table or index data. Rows can span blocks, free space 375 is allocated for insertion of new rows and for updates to rows that require additional space (for example, when a trailing null is updated to a non-null value).

FIG. 4 depicts a flow chart that illustrates an example of a write operation in an environment in accordance with an illustrative embodiment. In a particular embodiment, the components of the diagram 400 show aspects of FIG. 2 and the components of Application 200 of FIG. 1.

In the illustrated embodiment, the system receives a write request 410. The vector embedding is extracted from the request 420. At step 430, the system finds or creates a block in the data store for a rule. For example, the block is determined based on a similarity learning between the rule of an existing block and the vector embedding. Known similarity learning methods comprise cosine similarity, and or Siamese networks. Another example comprises a vector distance between two or more vector embeddings according to a Euclidean Distance. Other methods such as clustering and/or classification may also be used. If there is no existing block or there is no space in existing data block that meets the rule, a new block for that rule will be created and the vector embedding saved in it. In another example, a new block with a new rule may be created and the vector embedding written to the new block. A new block may be created, for example, by a computer processor performing a memory allocation for the size a block in a physical or logical space of the computer.

In an embodiment, the system comprises one general rule based for example, on a distance of vectors and another specific rule. In some examples, the specific rule may be user defined and/or based on the distance and/or similarity learning. The distance can be used to group vectors, vectors with short distance can be treated as one group, and vectors in one group will be saved to same data block.

At step 440, the vector embedding is written to the block, the block identifier is extracted for the block 450, as explained above, and the metadata value is updated 460 with the rule and block address. At step 470, a decision is made if there are more rules. For example, the system may determine more rules for the input vector embedding according to the methods described above. If YES, repeat step 430. If NO, the process ends.

FIG. 5 depicts a flow chart that illustrates an example of a read operation in accordance with an illustrative embodiment. In a particular embodiment, the components of the diagram 500 show aspects of FIG. 2 and the components of Application 200 of FIG. 1.

In the illustrated embodiment, the system receives a read request at step 510. At step 520, the system determines the block of the data store from the input. For example, the system may query a metadata value with a rule extracted from the input using a comparison method such as text matching and/or similarity matching methods described above. At step 530, the system performs a read of a vector embedding from the block using a block identifier determined from the metadata. The system checks if there are more data blocks to read at step 540. If YES, repeat step 520. Otherwise, the process ends.

In some embodiments, if there is no rule match, and there is only general rule such as a Euclidean distance previously described in data block, as vectors are grouped by general rule and saved to same block, once the system finds that the query request is with a certain distance threshold from a rule of a metadata, the vectors in the same data block are more likely to meet the request, the system will return the vector embeddings for this rule. If no same rule found and there is no general rule, get the results with a default rule for example as defined by a user.

Figure 6:
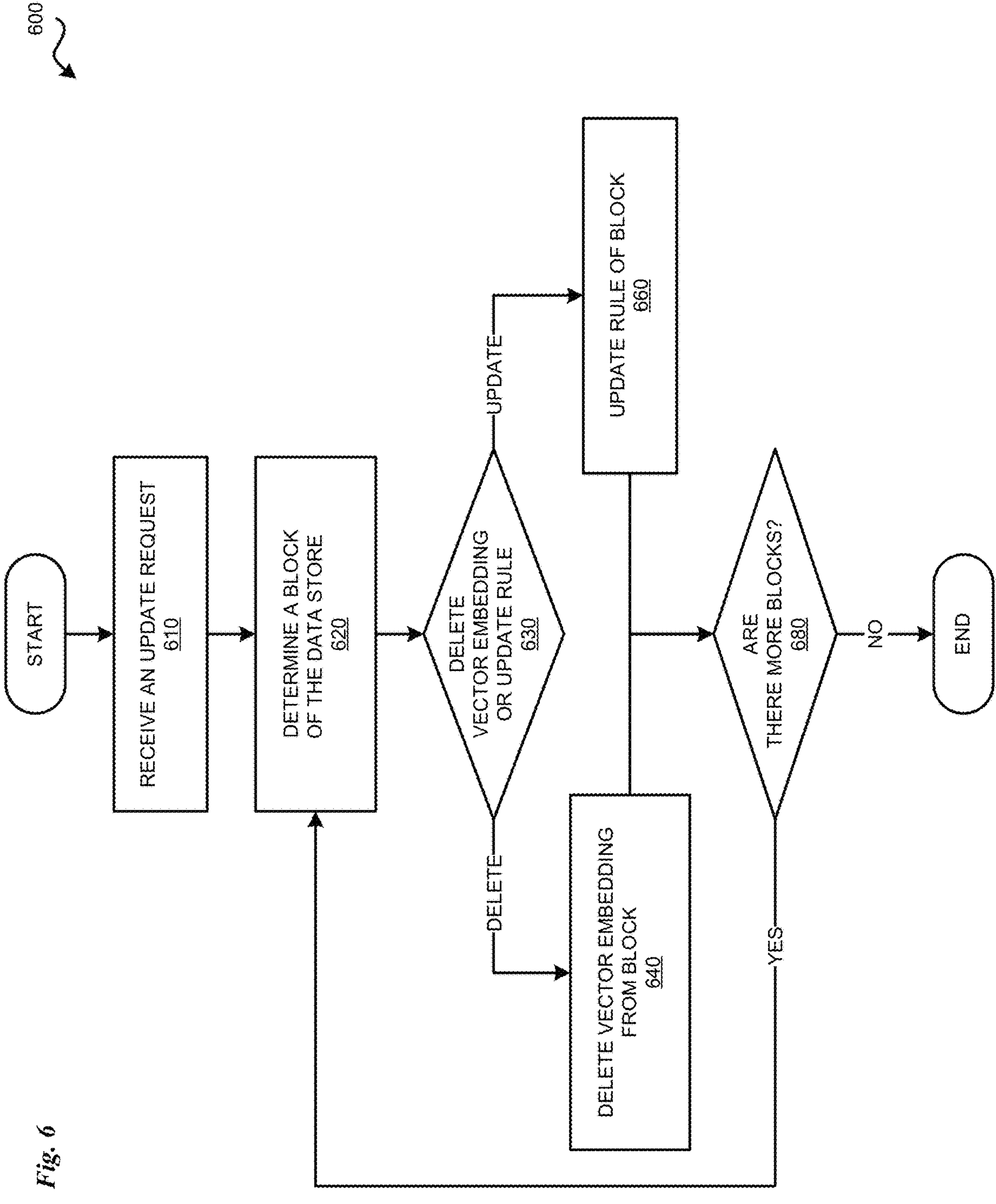
FIG. 6 depicts a flow chart that illustrates an example of an update operation in accordance with an illustrative embodiment.

FIG. 6 depicts a flow chart that illustrates an example of an update operation in accordance with an illustrative embodiment. In a particular embodiment, the components of the diagram 600 show aspects of FIG. 2 and the components of Application 200 of FIG. 1.

In the illustrated embodiment, at step 610 the system receives an update request. For example, an update request may be to change a rule of vector embedding or to delete a vector embedding. At step 620, the system determines the block of the data store from the input. For example, the system may query a metadata value with a rule extracted from the input using a comparison method such as text matching and/or similarity matching methods described above. Next, at step 630, the system decides whether the request is to delete the vector embedding or update a rule of the block. If the request is a delete, the system performs a delete of the vector embedding from the block 640 associated with the rule. If the request is an update, the rule for the block is updated at step 660. In some embodiments, the system may perform a check to determine if the updated rule and a vector embedding in the block still have a relationship under the similarity learning and/or distance methods as described above. At step 680, the system decides if there are more blocks that are to be updated. If YES, step 620 is repeated. If NO, the process ends.

Figure 7:
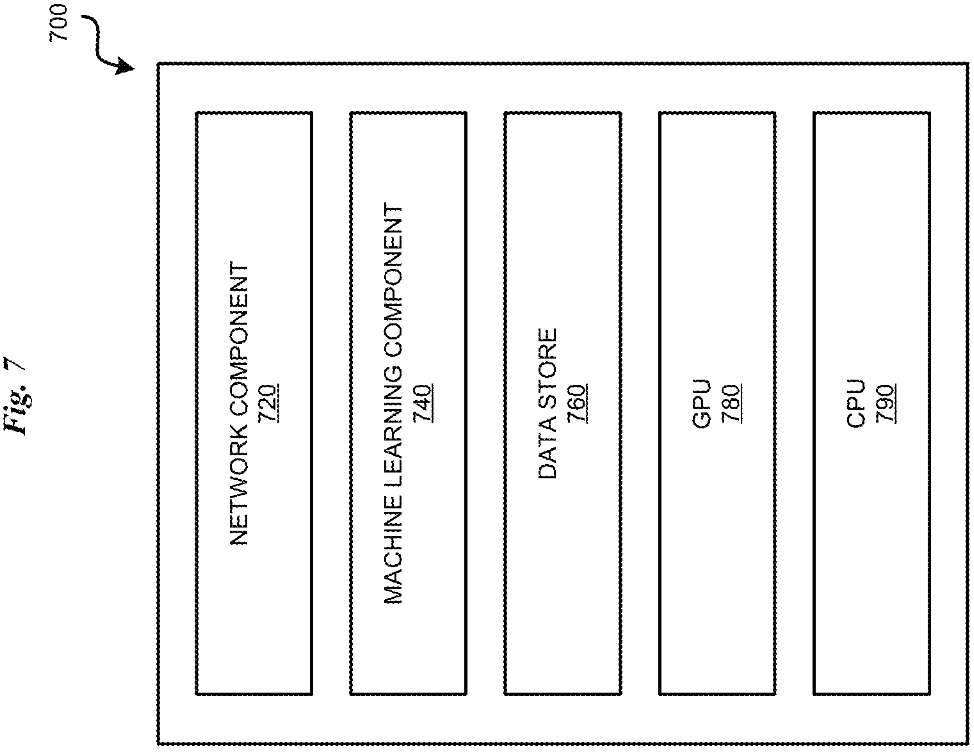
FIG. 7 depicts a system diagram that illustrates an example optimized vector data storage system in accordance with an illustrative embodiment.

FIG. 7 depicts a system diagram that illustrates an example optimized vector data storage system in accordance with an illustrative embodiment. In a particular embodiment, the components of the diagram 700 show aspects of the components of FIGS. 1-6.

In the illustrated embodiment, an optimized vector data storage system may comprise a network component 720, a machine learning component 740, a data store 760, a graphical processing unit (GPU) 780 and a central processing unit (CPU) 790. For example, the network component may comprise a network adaptor, a socket, a graphics card, one or more routers, switches, hubs, and/or other network connectivity devices. The network component may transmit and/or receive data via network links such as data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet Protocols (TCP/IP), or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection.

A physical data storage device is the underlying technology behind a data store 760. The data store may comprise formats such as files, tables, or blocks stored on a device. The device can be local, remote, or in the cloud. Large data stores are typically distributed across multiple physical devices in different geographic locations. Software systems and services abstract the underlying operations of the data store. Different types of data storage devices provide varying degrees of security and redundancy. A solid-state drive (SSD) is a semiconductor technology that allows the writing and reading of data in flash memory chips. Flash storage technology was commercially available in pen drives before becoming an alternative to hard disk drives (HDD). Compared to an HDD, a physical SSD has no moving parts, which means it has faster performance and a longer lifespan. Hybrid storage array is a physical storage setup that consists of an SSD and an HDD. While an SSD offers a low-latency operation, it costs much more per-unit storage than an HDD. Therefore, organizations use a hybrid storage array to balance performance, capacity, and cost. RAID stands for a redundant array of independent disks. It is a technology that keeps the same data in multiple places on an SSD.

In an embodiment, the system comprises a machine learning component 740. For example, the machine learning component may comprise a Graphics Processing Units (GPU) that are used for machine learning models due to their highly parallel processing architecture, well-suited for vector operations required in matrix multiplication; Tensor Processing Units (TPUs): designed specifically for machine learning tasks, often with optimized vector processing capabilities for high throughput; and Field Programmable Gate Arrays (FPGA) that may be customized to implement specialized vector processing units for specific machine learning model architectures.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “illustrative” is used herein to mean “serving as an example, instance or illustration.” Any embodiment or design described herein as “illustrative” is not necessarily to be construed as preferred or advantageous over other embodiments or designs. The terms “at least one” and “one or more” are understood to include any integer number greater than or equal to one, i.e., one, two, three, four, etc. The terms “a plurality” are understood to include any integer number greater than or equal to two, i.e., two, three, four, five, etc. The term “connection” can include an indirect “connection” and a direct “connection.”

References in the specification to “one embodiment,” “an embodiment,” “an example embodiment,” etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

responsive to receiving a request by a system, determining the request is a write operation of a vector embedding to a block of a data store of the system;

performing the write operation of the vector embedding to the block of the data store wherein the block is determined according to a rule, the rule comprising a characteristic of the vector embedding wherein performing the write operation according to the rule reduces computer load and enhances performance of the data store of the system; and extracting an identifier of the block and modifying a metadata value of the data store with the identifier and the rule.

2. The computer-implemented method of claim 1, performing a read operation of the vector embedding from the block of the data store wherein the block is determined according to a comparison between the request and the rule in the metadata value of the data store wherein responsive to a distance between the request and the rule below a threshold, the read operation reads all vector embeddings stored in the block, wherein all the vector embeddings are in accordance with the rule.

3. The computer-implemented method of claim 1, wherein performing the write operation comprises creating a new block based on a new rule.

4. The computer-implemented method of claim 1, wherein the rule is based on a vector distance between two or more vector embeddings.

5. The computer-implemented method of claim 1, wherein the block is determined based on a similarity learning between the rule and the vector embedding.

6. The computer-implemented method of claim 1, wherein updating the rule causes a modification of a metadata value.

7. The computer-implemented method of claim 1, performing a delete operation of the vector embedding from the block of the data store wherein the block is determined according to a comparison between the request and the rule and the vector embedding is deleted from the metadata value.

8. A computer program product comprising one or more computer readable storage media, and program instructions collectively stored on the one or more computer readable storage media, the program instructions executable by a processor to cause the processor to perform operations comprising:

responsive to receiving a request by a system, determining the request is a write operation of a vector embedding to a block of a data store of the system;

performing the write operation of the vector embedding to the block of the data store wherein the block is determined according to a rule, the rule comprising a characteristic of the vector embedding wherein performing the write operation according to the rule reduces computer load and enhances performance of the data store of the system; and extracting an identifier of the block and modifying a metadata value of the data store with the identifier and the rule.

9. The computer program product of claim 8, performing a read operation of the vector embedding from the block of the data store wherein the block is determined according to a comparison between the request and the rule in the metadata value of the data store wherein responsive to a distance between the request and the rule below a threshold, the read operation reads all vector embeddings stored in the block, wherein all the vector embeddings are in accordance with the rule.

10. The computer program product of claim 8, wherein performing the write operation comprises creating a new block based on a new rule.

11. The computer program product of claim 8, wherein the rule is based on a vector distance between two or more vector embeddings.

12. The computer program product of claim 8, wherein the block is determined based on a similarity learning between the rule and the vector embedding.

13. The computer program product of claim 8, wherein updating the rule causes a modification of a metadata value.

14. The computer program product of claim 8, performing a delete operation of the vector embedding from the block of the data store wherein the block is determined according to a comparison between the request and the rule and the vector embedding is deleted from the metadata value.

15. A computer system comprising a processor and one or more computer readable storage media, and program instructions collectively stored on the one or more computer readable storage media, the program instructions executable by the processor to cause the processor to perform operations comprising:

responsive to receiving a request by a system, determining by the processor the request is a write operation of a vector embedding to a block of a data store of the system;

performing by the processor the write operation of the vector embedding to the block of the data store wherein the block is determined according to a rule, the rule comprising a characteristic of the vector embedding wherein performing the write operation according to the rule reduces computer load and enhances performance of the data store of the system; and extracting by the processor an identifier of the block and modifying a metadata value of the data store with the identifier and the rule.

16. The computer system of claim 15, performing a read operation of the vector embedding from the block of the data store wherein the block is determined according to a comparison between the request and the rule in the metadata value of the data store wherein responsive to a distance between the request and the rule below a threshold, the read operation reads all vector embeddings stored in the block, wherein all the vector embeddings are in accordance with the rule.

17. The computer system of claim 15, wherein performing the write operation comprises creating a new block based on a new rule.

18. The computer system of claim 15, wherein the rule is based on a vector distance between two or more vector embeddings.

19. The computer system of claim 15, wherein the block is determined based on a similarity learning between the rule and the vector embedding.

20. The computer system of claim 15, performing a delete operation of the vector embedding from the block of the data store wherein the block is determined according to a comparison between the request and the rule and the vector embedding is deleted from the metadata value.

* * * * *